United States Patent [19]

Stephan, deceased et al.

[11] Patent Number: 5,355,979
[45] Date of Patent: Oct. 18, 1994

[54] DAMPING ELEMENT FOR DAMPING TRANSLATORY MOTION

[76] Inventors: Christoph H. Stephan, deceased, late of Sindelfingen; by Dorothea Stephan, heir and legal representative, Vaihinger Strasse 25, 7032 Sindelfingen; by Otto Stephan, heir and legal representative; by Ilse Stephan, heir and legal representative, both of Jasminstrasse 8, 7030 Böblingen-Dagersheim; Wilfried Weber, Am Stücklesberg 10, 7294 Schopfloch, all of Fed. Rep. of Germany

[21] Appl. No.: 964,495

[22] Filed: Oct. 21, 1992

[30] Foreign Application Priority Data

Oct. 25, 1991 [DE] Fed. Rep. of Germany ....... 4135216

[51] Int. Cl.⁵ .............................................. F16D 57/00
[52] U.S. Cl. ................................. 188/290; 188/322.5; 192/45.2; 192/41 R; 192/4 B
[58] Field of Search ............... 188/82.84, 82.9, 82.77, 188/82.7, 82.74, 82.1, 82.3, 82.34, 290, 293, 296, 322.5; 192/45.2, 41 R, 7, 4 B, 12 A; 16/51

[56] References Cited

U.S. PATENT DOCUMENTS

| 2,444,570 | 7/1948 | Lawrence et al. | |
|---|---|---|---|
| 2,664,183 | 12/1953 | Payne | 188/82.84 X |
| 3,581,857 | 6/1971 | Dallman | 192/41 R |
| 4,125,074 | 11/1978 | Sato | 188/82.7 X |
| 4,527,675 | 7/1985 | Omata et al. | 188/322.5 X |
| 4,565,266 | 1/1986 | Omata | 188/322.5 |
| 4,570,769 | 2/1986 | Isaka | 192/46 |
| 4,574,423 | 11/1986 | Ito et al. | 188/82.1 X |
| 4,660,881 | 4/1987 | Komeya et al. | 188/322.5 X |
| 4,697,673 | 6/1987 | Omata | 188/290 X |
| 4,838,401 | 6/1989 | Nagano | 188/82.77 X |
| 4,984,666 | 1/1991 | Orii et al. | 192/7 |
| 5,000,721 | 3/1991 | Williams | 192/46 X |
| 5,165,507 | 11/1992 | Ohshima | 188/322.5 X |

FOREIGN PATENT DOCUMENTS

| 0120489 | 3/1984 | European Pat. Off. . |
| 0144542 | 8/1984 | European Pat. Off. . |
| 1991782 | 8/1968 | Fed. Rep. of Germany . |
| 2160903 | 6/1972 | Fed. Rep. of Germany . |
| 2723954 | 11/1978 | Fed. Rep. of Germany . |
| 3601720 | 7/1987 | Fed. Rep. of Germany . |
| 3722114 | 1/1988 | Fed. Rep. of Germany . |

OTHER PUBLICATIONS

Patent Abstracts of Japan: M-293, Apr. 28, 1984, vol. 8.
Patent Abstracts of Japan: M-892, Nov. 14, 1989, vol. 13, No. 506.

*Primary Examiner*—Mark T. Le
*Assistant Examiner*—Peter M. Poon

[57] ABSTRACT

The damping element for damping translatory motion of a body over a relatively stationary base includes a housing holding a viscous fluid; a friction disk in the viscous fluid in the housing coupled with a shaft extending from the housing; a rotatable drive element having an axis of rotation, connected to the shaft outside the housing, formed so that the drive element can be driven rotatably due to a translatory motion of the body over the base and provided with a cavity coaxial to the axis of rotation; and a coupling device including a freewheel device in the cavity of the drive element and connecting the friction disk and the rotatable drive element and structured so that rotation of the drive element in one direction results in a torque transferring connection between the friction disk and the drive element, while rotation of the drive element in an opposite direction opposite results in interruption of the torque transferring connection between the friction disk and the drive element.

7 Claims, 3 Drawing Sheets

DAMPING ELEMENT FOR DAMPING TRANSLATORY MOTION

BACKGROUND OF THE INVENTION

The present invention relates to a damping mechanism for damping of a translatory motion and, more particularly, to a damping mechanism for damping a translatory motion initiated by a spring in various devices including automatically opening spring-loaded drawers and the like.

To open ash-trays, drawers and containers, particularly in the case of devices built into motor vehicles, damping elements are used to improve operating convenience. The damping elements consist of a housing filled with or holding a viscous fluid, in which there is a friction disk connected by a shaft to an exterior drive element. The drive element is generally a gear wheel which is connected with a toothed rack or a gear wheel segment on the stationary base on which the translatory motion occurs. The damping element is mounted on the body to be moved, on which, for example a spring element acts to urge the body to be moved into motion. The rolling of the gear wheel on the toothed rack causes the friction disk to rotate in the housing filled with a viscous fluid, for example, silicone oil. Because of the indentations and recesses provided on its peripheral surface, the friction disk is braked by the increased friction, so that a translatory movement of the body to be moved, for example, a flap to be opened, is damped. Closure of the flap is generally caused by pushing the body back by hand. Through the direct connection between the drive element and the friction disk the braking action of the damping element is also effective as the flap is pushed back and forth. This is normally considered irksome by the person operating the flap since increased force and more time is required to close the flap than would be required without damping. Furthermore too great a pressure during closing of the flap subjects the friction element to increased stress, which causes increased wear and tear on the damping element.

SUMMARY OF THE INVENTION

It is an object of the present invention to provide a damping element for a translatory motion of a body relative to a base or another body, which provides a damping effect only in one direction of motion, but not in a direction opposite to the one direction.

According to the invention, a damping element for damping translatory motion of a body over a base, comprises a housing holding, advantageously filled with a viscous fluid; a friction disk in the viscous fluid in the housing coupled to a shaft extending from the housing; a drive element mounted on the shaft outside the housing, the drive element being formed so that the drive element can be driven rotatably due to a translatory motion of the body over the base; and coupling means connecting the friction disk and the drive element and structured so that rotation of the drive element in one direction results in a torque transferring connection between the friction disk and the drive element, while rotation of the drive element in a direction opposite to that one direction results in an interruption of the torque transferring connection between the friction disk and the drive element.

Between the friction disk and the drive element a coupling device is provided which permits the transfer of torque in one direction of rotation, while in the opposite direction permitting comparatively free rotation. In the case of a translatory movement produced, for example, by a spring, the drive element rolling on a relatively stationary toothed rack transfers a torque to the friction disk which causes the friction disk to rotate with the drive element in the housing holding the viscous fluid. The braking effect therefore occurs, because of the increased friction of the friction disk in the fluid. As the body undergoing translatory motion is pushed back, the friction disk is disconnected from the drive element, so that it is possible to push back the body without restraint. The disengagement of the friction disk from the drive element can be caused when the drive element has a circular-symmetric cavity arranged coaxially about its axis of rotation in the which a free-wheel device is installed. The free-wheel device can be formed by a plastic part having a hub and three resilient arms which extend from the hub and project in the circumferential direction and bend in the direction of rotation of the driving element. The ends of the resilient arms have integrally injection-molded clamping parts projecting in an axial direction laterally from one side thereof. These clamping parts become jammed between the sloping surface on the plastic part and an inner wall of the cavity of the drive element when the plastic part is rotated in one direction but run freely when the plastic part is rotated in another direction.

Normally, free-wheel devices consist of an inner and outer ring between which clamping rollers held by a retainer are arranged. For reasons of cost and space, a multi-part free-wheel mechanism of this type is not suitable for customarily used damping elements having a diameter of about 10 mm. The structure according to the invention of the free-wheel mechanism as a plastic part with integrally injection-molded resilient arms and clamping parts means that the free-wheel mechanism can be used in the drive element of the damping element and is inexpensive to manufacture. Moreover, it is possible to make the free-wheel mechanism without modifying the damping element itself.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
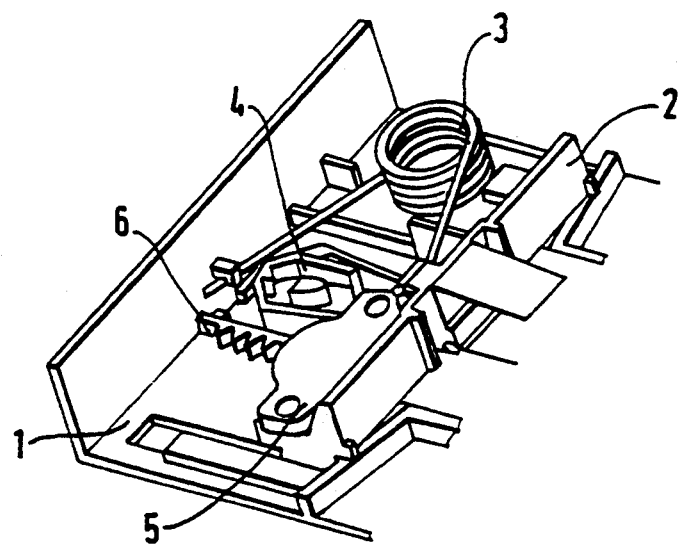
FIG. 1 is a perspective view of a damping element according to the invention installed in a container for magnetic tape cassettes.

FIG. 1 shows a portion of a relatively stationary base 1 of a container for receiving magnetic tape cassettes. The base 1 has a body or slider member 2 spring-loaded by a spring element 3 and a locking mechanism 4. When the locking mechanism 4 has been released or unlocked, the body or slider member 2 is driven by the spring element 3 into a removal position for, e.g., a magnetic tape cassette held on it. To damp this translatory motion, i.e. the motion of the body away from the spring element 3, a damping element 5 is mounted on the body or slider member 2 and engages with a gear wheel, its drive element 7, in a toothed rack 6 fixed to the base 1. As the body or slider member 2 moves away from the spring element 3, the gear wheel rolls and rotates on the toothed rack 6 causing a friction disk located in the damping element 5 to rotate with it and, because of the increased friction in the viscous liquid contained in the damping element 5, the friction disk acts as a brake during the translatory motion of the body or slider member 2 away from the spring element.

Figure 2:
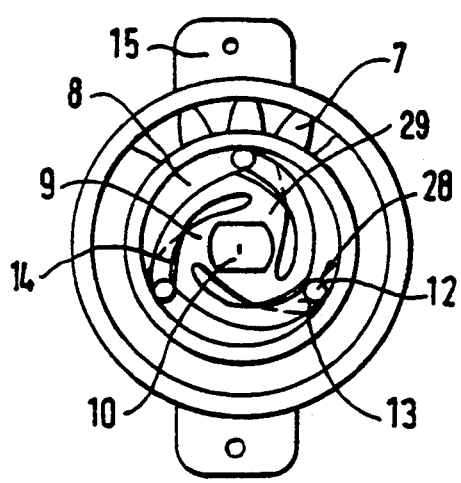
FIG. 2 is a top plan view of a free-wheel mechanism in the drive device of the damping element of FIG. 1.
Figure 3:
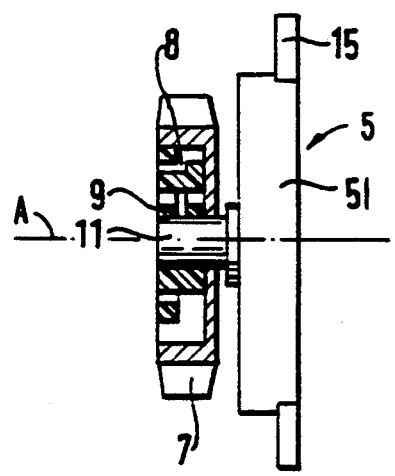
FIG. 3 is a side cross-sectional view of the free-wheel mechanism of FIG. 2.
Figure 4:
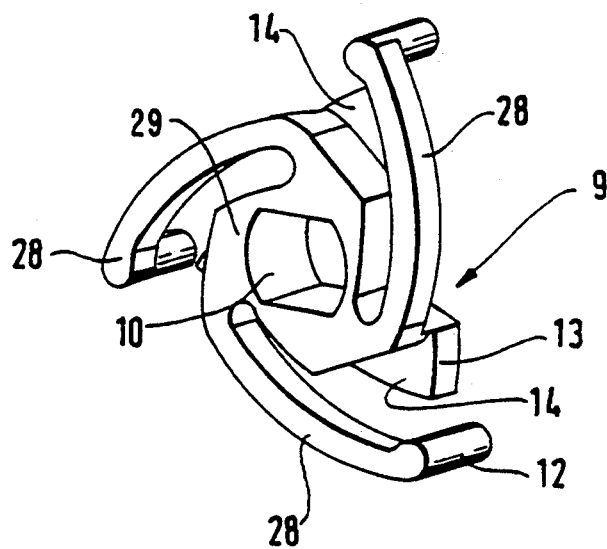
FIG. 4 is a perspective view of a plastic part of the free-wheel mechanism of FIG. 2.

FIGS. 2 and 3 show a damping element 5 with the drive element 7 formed as a gear wheel. A free-wheel device is arranged in the approximately cylindrical or disk-like cavity 8 coaxial to the axis of rotation A of the drive element 7. The free-wheel device consists of plastic part 9, illustrated in perspective in FIG. 4, which has a central bore 10 with two faces for mounting on the free end of shaft 11 projecting from the damping element 5. The plastic part 9 has a hub 29 with three resilient arms 28 projecting from the hub 29 in a circumferential direction. The resilient arms 28 bend in the direction of rotation of the drive element 7 and at the ends of each of the arms a clamping part 12 projects in an axial direction laterally from the plastic part 9 on one side of it. As the body or slider member 2 moves away from the spring element 3, the clamping parts 12 are wedged between an inner wall of cavity 8 of the drive element 7 and sloping surfaces 13 formed on the plastic part 9. The wedging action causes a transfer of torque from the gear wheel to the shaft 11 of the damping element 5, so that the friction disk located in the damping element is caused to rotate with the gear wheel, i.e. the rotatable drive element 7. The translatory movement of the body or slider member 2 over the base away from the spring element is then damped.

However when pushing the slider member 2 toward the spring element 3 by hand, the direction of rotation of the gear wheel (rotatable drive element 7) is reversed. Because of the resiliency of the resilient arms 28, the clamping parts 12 are released from their wedged state, so that the plastic part 9 is now able to rotate freely in the approximately cylindrical cavity of the drive element 7. The torque-transferring connection between the friction disk in the damping element and the drive element 7 is thus interrupted, so that the gear wheel is able to rotate freely without restraint from the free-wheel device. To enable the resilient arms 28 to bend inward onto the sloping surfaces 13, recesses 14 are provided in the plastic part 9 in the vicinity of the sloping surfaces 13. To attach the damping element 5 to the slider member 2, the damping element housing 51 is provided with fixing lugs 15.

Figure 5:
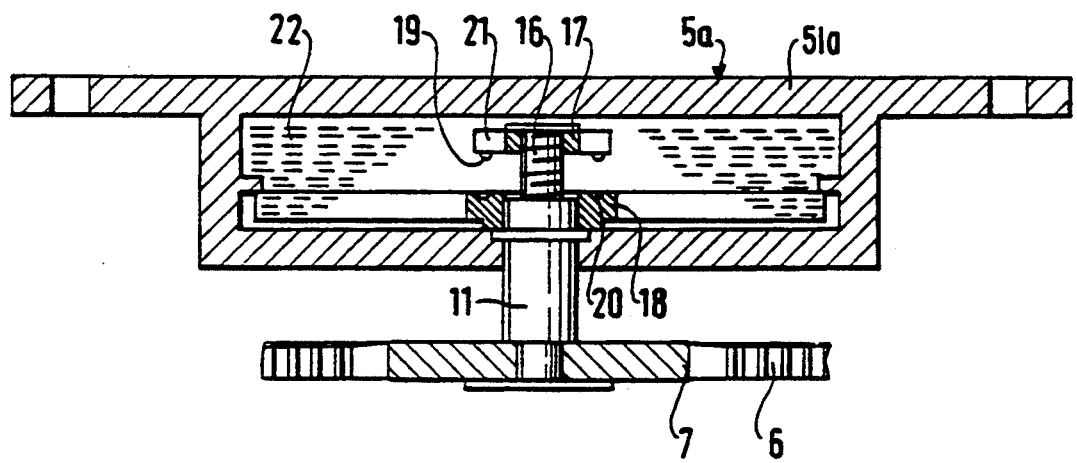
FIG. 5 is a cross-sectional view through a driving plate, which is axially displaceable via threads for engagement with a friction disk of the damping element of FIG. 1.

Another embodiment of the coupling device between the friction disk 18 and the drive shaft 11 in the damping element 5a is shown in FIG. 5. When the shaft 11 rotates as a result of engagement of drive element 7 in the toothed rack 6, the thread 16 on shaft 11 draws the driving plate 17 provided with corresponding internal thread towards the friction disk 18, so that the projections 19 arranged on the end face of the driving plate 17 engage in bores 20 of the friction disk 18 which are spaced the same distance from the axis of the shaft 11 as the projections 19. So that the outer moment at the driving plate 17 is greater than the release torque of the thread, the driving plate 17 is provided on its peripheral surface with indentations 21. The driving plate 17 therefore experiences increased friction in the viscous fluid 22 with which the damping element 5a is filled. This increased friction prevents the driving plate from co-rotating, so that the axial displacement of the driving plate in the direction of the friction disk is caused by the thread 8. When the projections 19 have locked into the bores 20 of the friction disk 18, a torque-transferring connection is formed between the gear wheel and the friction disk 18, so that the damping effect of the friction disk 18 comes into play. When the direction of rotation of the gear wheel or drive element 7 is reversed, the driving plate 17 is again disengaged from the friction disk 18 via thread 16, so that the friction disk 18 is no longer rotated with the gear wheel. In this direction of rotation there is thus no damping of the translatory movement of the slider member 2.

Figure 6:
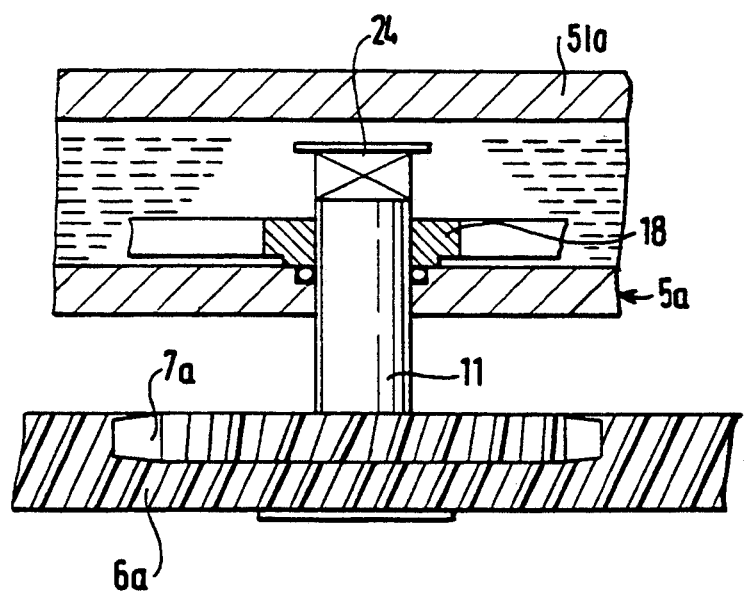
FIG. 6 is a cutaway cross-sectional view of another embodiment of the damping element of the invention showing a shaft of the damping element axially displaceable by a gearwheel with slanting teeth as drive element.
Figure 7:
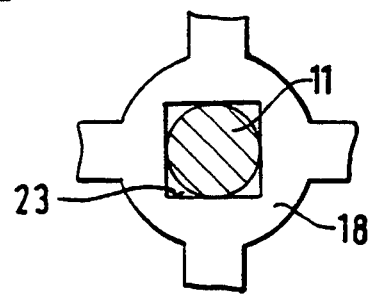
FIG. 7 is another cross-sectional view through the embodiment shown in FIG. 6.

In the embodiment shown in FIGS. 6 and 7, the axial displacement of the shaft 11 is achieved by a gear wheel 7a with slanting teeth, which is driven by a relatively stationary toothed rack 6a which also has slanting teeth. Depending on the direction of rotation of the gear wheel 7a, the slanting teeth produce a force component of the gear wheel 7a in the direction of the damping element 5a or in the opposite direction. This axial displacement of the shaft 11 enables it to be engaged with or disengaged from the friction disk 18. To that end, the friction disk has square bore 23 into which a square member 24 arranged on the shaft can be drawn by axial displacement. This square member 24 on the shaft provides a torque-transferring connection between the drive element 7a and the friction disk 18. Thus in one direction of rotation of the drive element 7a the shaft 11 is automatically engaged with the friction disk 18, and in the opposite direction of the rotation the shaft 11 is disengaged from the friction disk 18.

Figure 8:
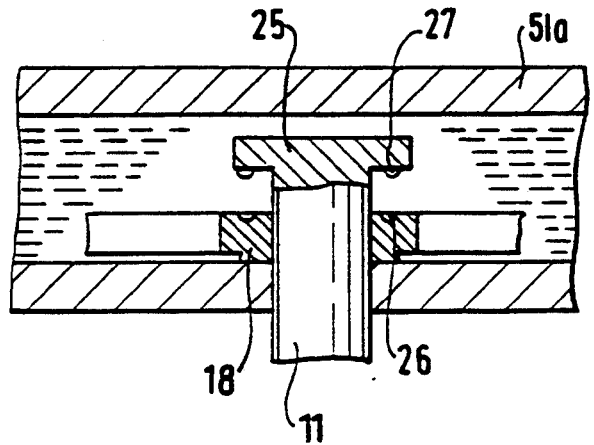
FIG. 8 is a cross-sectional view similar to FIG. 5 through an additional embodiment of the damping element of the invention.

In the embodiment shown in FIG. 8, the end of the shaft 11 is provided with a driving plate or flange 25, on the end face of which facing the friction disk 18 there are projections 27 which engage in corresponding bores 26 in the friction disk 18. The axial displacement of the shaft 11 is caused in the same manner as in FIG. 5. Instead of being constrained to rotate by projections and bores, the friction disk 18 can also be caused to rotate by providing a toothed ring on the end face of the driving flange which engages in a corresponding toothed ring on the friction disk. This structure is also shown in FIG. 8, since the projections 27 can be gear teeth and the bores 26 can be the spaces between the gear teeth.

It will be understood that each of the elements described above, or two or more together, may also find a useful application in other types of structures differing from the types described above.

While the invention has been illustrated and described as embodied in a damping element for damping translatory motion, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A damping element for damping translatory motion of a body over a relatively stationary base, comprising:

a housing holding a viscous fluid;

a friction disk in the viscous fluid in the housing coupled with a shaft extending from the housing;

a rotatable drive element having an axis of rotation and connected to the shaft outside the housing, said drive element being provided with a cavity coaxial to said axis of rotation and said drive element being formed so that said drive element can be driven rotatably due to a translatory motion of the body over the base; and coupling means connecting the friction disk and the rotatable drive element, wherein said coupling means includes a free-wheel device arranged in said cavity of said drive element and said coupling means is structured so that rotation of the drive element in one direction results in a torque transferring connection between the friction disk and the drive element so as to damp rotational motion of said rotatable drive element in said one direction, while rotation of the drive element in a direction opposite to said one direction results in an interruption of the torque transferring connection between the friction disk and the drive element so that said rotation of said drive element in said opposite direction is undamped.

2. A damping element according to claim 1, wherein the free-wheel device comprises a plastic part having a hub and three resilient arms extending from the hub in a circumferential direction, said arms being bendable in a direction of rotation of the rotatable driving element and having free ends, each of said free ends of the resilient arms having an integrally injection-molded clamping part projecting in an axial direction laterally from the plastic part on one side of the plastic part, said clamping parts being formed to jam between a plurality of sloping surfaces provided on the plastic part and an inner wall of said cavity in the drive element.

3. A damping element according to claim 2, wherein the hub of the plastic part is provided with recesses in the vicinity of the sloping surfaces to accommodate the resilient arms.

4. A damping element for damping translatory motion, comprising:

a housing holding a viscous fluid;

a friction disk in the viscous fluid in the housing coupled with a shaft extending from the housing;

a rotatable drive element connected to the shaft outside the housing; and coupling means connecting the friction disk and the rotatable drive element and structured so that rotation of the drive element in one direction results in a torque transferring connection between the friction disk and the drive element so as to damp rotational motion of said rotatable drive element in said one direction, while rotation of the drive element in a direction opposite to said one direction results in an interruption of the torque transferring connection between the friction disk and the drive element so that said rotation of said drive element in said opposite direction is undamped.

5. A coupling means connecting a rotatable shaft with a rotatable drive element having an axis of rotation and a substantially cylindrical cavity coaxial to the axis of rotation, said coupling means consisting of a free-wheel device arranged in the cavity provided in the drive element, wherein the free-wheel device is formed by a plastic part having a hub nonrotatably mounted on said shaft, provided with a plurality of sloping surfaces and three resilient arms, each of said resilient arms extending from the hub in a circumferential direction and having a free end, said arms being bendable when said plastic part rotates in one direction of rotation so that said rotatable drive element can rotate freely relative to said rotatable shaft, each of said free ends of said resilient arms having an integrally injection-molded clamping part projecting in an axial direction laterally from the plastic part on one side of the plastic part and being formed so that, when said plastic part rotates in another direction opposite to said one direction of rotation, each of said clamping parts jams between one of said sloping surfaces provided on the plastic part and an inner wall of said cavity in the drive element so that said rotatable drive element is nonrotatably fixed on said shaft.

6. A coupling means according to claim 5, wherein said rotatable drive element is a gear wheel.

7. A damping device for damping translatory motion, comprising:

a base having a toothed rack attached thereto;

a body movable over said base in either of two motion directions over said toothed rack;

a housing attached to said body and holding a viscous fluid;

a friction disk in the viscous fluid in the housing coupled with a shaft extending from the housing;

a rotatable drive element consisting of a gear wheel connected to the shaft outside the housing and engaged in said toothed rack so that, when said body moves over said base, said rotatable drive element is rotated in one of two rotation directions depending on said motion direction of said body over said base; and coupling means connecting the friction disk and the rotatable drive element and structured so that rotation of the drive element in one rotation direction results in a torque transferring connection between the friction disk and the drive element so that motion of said body over said base is damped, while rotation of the drive element in a direction opposite to said one rotation direction results in an interruption of said torque transferring connection between the friction disk and the drive element so that motion of said body over said base is not damped.

* * * * *